US 12,444,192 B1

United States Patent
Huang (10) Patent No.: US 12,444,192 B1
(45) Date of Patent: Oct. 14, 2025

(54) METHOD AND ELECTRONIC DEVICE FOR DISTRIBUTING IMAGE DESCRIPTION TEXT

(71) Applicant: TP-Link Systems Inc., Irvine, CA (US)

(72) Inventor: Dizhen Huang, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/967,637

(22) Filed: Dec. 3, 2024

(51) Int. Cl.
    *G06V 20/40* (2022.01)
    *G06F 16/583* (2019.01)
    *G06V 10/82* (2022.01)
    *G06V 20/62* (2022.01)
    *G06V 40/10* (2022.01)
    *G06V 40/16* (2022.01)

(52) U.S. Cl.
    CPC ............ *G06V 20/44* (2022.01); *G06F 16/583* (2019.01); *G06V 10/82* (2022.01); *G06V 20/625* (2022.01); *G06V 40/103* (2022.01); *G06V 40/161* (2022.01)

(58) Field of Classification Search
    CPC ...... G06V 20/44; G06V 10/82; G06V 20/625; G06V 40/103; G06V 40/161; G06F 16/583
    See application file for complete search history.

(56) References Cited

U.S. PATENT DOCUMENTS

| | | | |
|---|---|---|---|
| 9,936,086 B2 | 4/2018 | Rothschild | |
| 2015/0341569 A1* | 11/2015 | Takita | H04N 23/698 348/705 |
| 2019/0228276 A1* | 7/2019 | Lei | G06F 18/2163 |
| 2020/0178040 A1* | 6/2020 | Sharma | H04W 72/30 |
| 2023/0391357 A1* | 12/2023 | Yang | G06V 20/58 |
| 2024/0153275 A1* | 5/2024 | Jagadeesan | G06V 20/44 |

FOREIGN PATENT DOCUMENTS

| | | |
|---|---|---|
| CN | 105938485 A | 9/2016 |
| CN | 110478204 A | 11/2019 |
| CN | 114638338 A | 6/2022 |
| IN | 202241035761 A | 12/2023 |

* cited by examiner

*Primary Examiner* — Dhaval V Patel
(74) *Attorney, Agent, or Firm* — Loeb & Loeb LLP (57) ABSTRACT

The present disclosure provides a method and an electronic apparatus for distributing image description text. The method including: obtaining video data including multiple images; performing image recognition processing on the multiple images to identify images with important information, the important information indicates objects and/or events in the images; in response to the objects and/or events satisfying predetermined triggering conditions, obtaining predefined keywords corresponding to the objects and/or events in the images; generating image description text indicating the objects and/or events based on the obtained predefined keywords and the images with important information; and distributing the generated image description text to terminal devices.

19 Claims, 9 Drawing Sheets

METHOD AND ELECTRONIC DEVICE FOR DISTRIBUTING IMAGE DESCRIPTION TEXT

TECHNICAL FIELD

The present disclosure relates to computer vision, and more specifically, to methods, electronic devices, and non-transitory computer-readable medium for distributing image description text.

BACKGROUND

With the advancement of computer vision technology and the growing need for security, the application of image capturing devices such as network cameras has become increasingly widespread. Existing network cameras typically only provide images or videos. Due to the limitations of communication network bandwidth and data usage, users may not be able to quickly review images or videos to obtain important surveillance information. There is a lack of functionality in existing technology to convert image content into text descriptions and push them to user terminals in a timely manner.

Furthermore, considering that cameras continuously capture images, if every image content were to be converted into text descriptions and pushed to user terminals, it would not only result in a very large amount of image processing computation but also lead to users receiving unwanted information.

Therefore, there is a need to be able to push real-time text descriptions of images or videos with important information, obtained by image capturing devices, to user terminals, allowing users to more quickly obtain important surveillance information without having to view the images or videos themselves.

SUMMARY

In view of the above problems, the present disclosure provides a method, electronic device, and non-transitory computer-readable medium for distributing image description text that can generate textual descriptions for images or videos containing important information. By generating textual descriptions based on keywords corresponding to the important information and the images with important information, the process ensures that key event details are not omitted, thereby enhancing the accuracy of the generated information.

According to an embodiment of the present disclosure, there is provided a method for distributing image description text, comprising: obtaining video data including multiple images; performing image recognition processing on the multiple images to identify images with important information, the important information indicates objects and/or events in the images; in response to the objects and/or events satisfying predetermined triggering conditions, obtaining predefined keywords corresponding to the objects and/or events in the images; generating image description text indicating the objects and/or events based on the obtained predefined keywords and the images with important information; and distributing the generated image description text to terminal devices.

According to another embodiment of the present disclosure, there is provided an electronic apparatus for distributing image description text, comprising: a memory; a processor, configured to: obtain video data including multiple images; perform image recognition processing on the multiple images to identify images with important information, the important information indicates objects and/or events in the images; in response to the objects and/or events satisfying predetermined triggering conditions, obtain predefined keywords corresponding to the objects and/or events in the images; generate image description text indicating the objects and/or events based on the obtained predefined keywords and the images with important information; and distribute the generated image description text to terminal devices.

According to another embodiment of the present disclosure, there is provided a non-transitory computer-readable medium having stored thereon instructions which, when executed, cause a processor to perform the method as described above.

According to embodiments of the present disclosure, by generating textual descriptions only for images or videos that satisfy specific objects and/or events, and by generating textual descriptions based on keywords corresponding to the important information and the images with important information, the process ensures that key event details are not omitted, thereby increasing the accuracy of the generated information.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements. In the accompanying drawings.

DETAILED DESCRIPTION

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "top", "bottom", "internal", "external", "inside" and "outside" are based on orientations or positional relationships shown in the drawings, only for the convenience of describing the present disclosure and simplifying the description, instead of indicating or implying the indicated equipment or element must have a particular orientation. In addition, terms such as "first", "second" and "third" are only for descriptive purposes, and cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect connections.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the meanings of the above terms in the present disclosure may be understood on a case-by-case basis.

In addition, technical features involved in different embodiments of the present disclosure may be combined with each other as long as no conflicts occurs therebetween.

Some of the drawings may not depict all the components of a given method, equipment and system. Like reference numerals may be used to denote like features throughout the specification and drawings.

The First Embodiment

Figure 1:
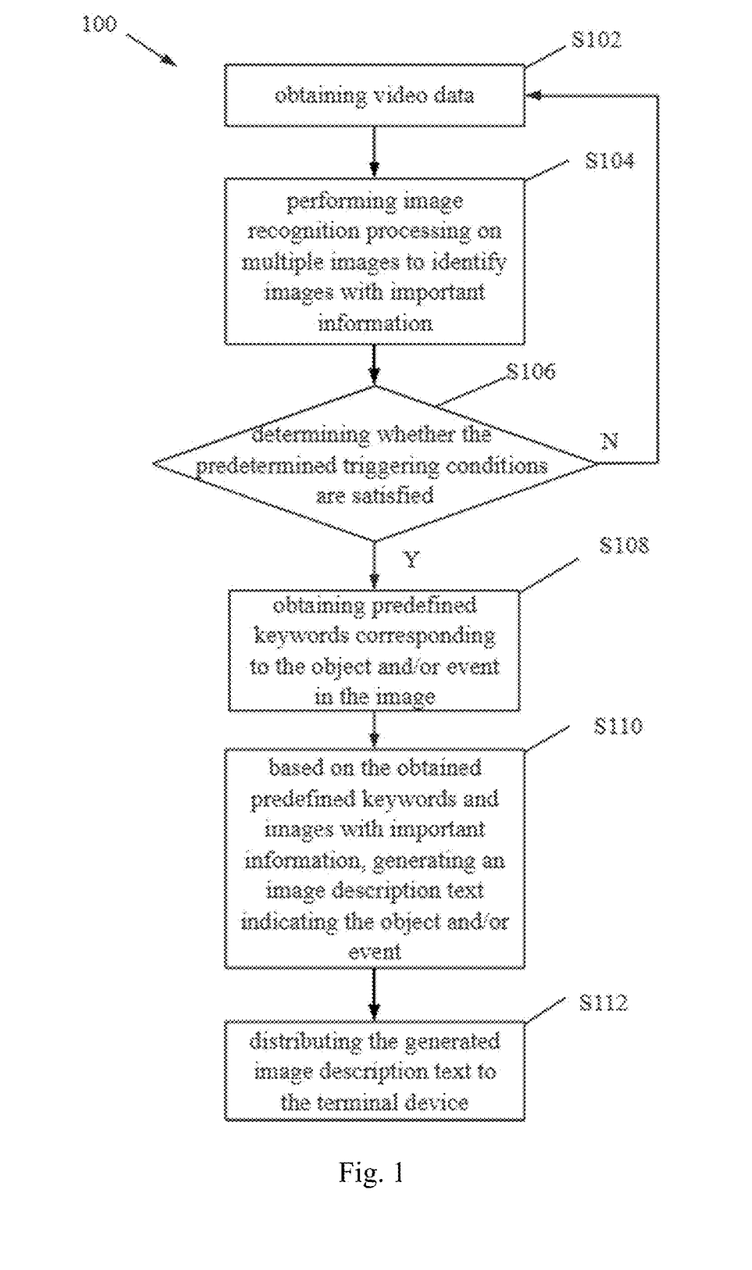
FIG. 1 illustrates a flowchart of a method for distributing image description text according to the first embodiment of the present disclosure.

FIG. 1 illustrates a flowchart of a method 100 for distributing image description text according to the first embodiment of the present disclosure. For example, the method may be executed by an image capturing device or a cloud server.

In one embodiment, the method 100 may be directly executed by an image capturing device (e.g., a network camera). For example, after obtaining video data, a network camera can execute method 100 through its processor.

In another embodiment, the method 100 may be executed by a server. The server can receive video data obtained by the image capturing device and then perform method 100 on the received video data. Below, the method 100 for distributing image description text will be specifically described, taking the server execution as an example.

Referring to FIG. 1, a method 100 for distributing image description text according to an embodiment of the present disclosure begins at block S102. At block S102, video data is obtained, which includes multiple images.

Specifically, in this embodiment, a cloud server can receive video data from an image capturing device (e.g., a network camera), and the video data can include capturing multiple images.

At block S104, the cloud server performs image recognition processing on multiple images to identify images with important information, where the important information indicates objects and/or events in the images.

For example, in some embodiments, the cloud server can detect predefined objects and/or events in the obtained video data and select images corresponding to those objects and/or events. Predefined objects and/or events include but are not limited to people, vehicles, packages, pets, crying, barking, and the sound of glass breaking.

For example, after performing image recognition processing on multiple images, the cloud server can select images corresponding to the object and/or event based on user-predefined rules, such as whether the object and/or event is an object and/or event of interest that the user has set in advance.

Performing image recognition processing on images to identify images with important information includes: constructing a training dataset for the object and/or event; training a neural network model with the training dataset to obtain a trained model; and inputting the multiple images into the trained model for model inference to obtain information indicating the object and/or event.

Figure 2A:
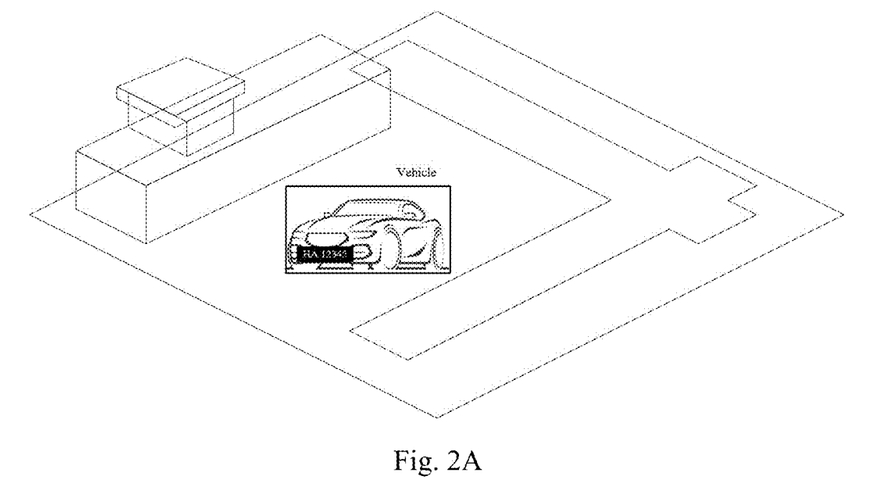
FIGS. 2A-2B illustrate schematic diagrams of vehicle detection and license plate recognition according to an embodiment of the present disclosure.

In one embodiment, the cloud server performs predefined object and/or event detection on the obtained video data, including vehicle detection, as shown in FIG. 2A.

The vehicle detection process includes: inputting the obtained image into a trained neural network model.

For example, inputting the image shown in FIG. 2A into a trained neural network model, and outputting the prediction results, including the location of the vehicle (bounding block) and category, as shown by the block and the labeled text "Vehicle" in FIG. 2A.

Training the neural network model can include the following steps:
 1. Dataset Construction
    1) Image Collection
       Collect image data containing vehicles; these images can come from public datasets such as UA-DETRAC, Vehicle-Dataset, BITVehicle, etc., or collected on your own.
    2) Data Annotation
       Use annotation tools such as Labelme to perform bounding block annotation on the targets, ensuring that each vehicle object is accurately marked.

2. Training the Neural Network Model
   1) Model Selection
      Choose an appropriate model architecture, such as the YOLO series models (YOLOv5, YOLOv6, YOLOv7, YOLOv8, etc.).
   2) Loss Function
      Select a suitable loss function, such as Focal Loss, which is used to address the problem of class imbalance and is particularly suitable for object detection tasks.
   3) Training Configuration
      Configure training parameters, such as learning rate, batch size, number of training epochs, etc.
   4) Training Process
      Load the pre-trained model and start training. Use data augmentation techniques such as random cropping, rotation, etc., to improve the model's generalization ability.
   5) Model Optimization
      During the training process, monitor loss and performance metrics, and adjust parameters to optimize model performance.

Referring back to FIG. 1, at block S106, the image capturing device or cloud server determines whether the predetermined triggering conditions are satisfied. If they are satisfied, the process proceeds to block S108; if not, it returns to block S102. In response to the object and/or event being a user-predefined object and/or event of interest, such as at least one of motion detection events, object detection events, license plate recognition events, and facial recognition events, it is determined that the object and/or event satisfies the predetermined triggering conditions.

At block S108, in response to the object and/or event satisfying the predetermined triggering conditions, predefined keywords corresponding to the object and/or event in the image are obtained. Obtaining predefined keywords corresponding to the object and/or event in the image includes: retrieving predefined keywords corresponding to the object and/or event in the image from a pre-stored keyword library. The predefined keywords may include detection type trigger condition keywords, such as "person", "vehicle", "pet", "package", etc.

In another embodiment, in response to the image recognition processing performed at block S104 being motion detection and object detection, it may be determined that the object and/or event satisfies the predetermined triggering conditions. Taking vehicle detection as an example, in response to the vehicle detection event satisfying the predetermined triggering conditions, predefined keywords corresponding to the vehicle in the image are obtained, i.e., "Vehicle".

At block S110, based on the obtained predefined keywords and images with important information, an image description text indicating the object and/or event is generated.

In one embodiment, generating an image description text indicating the object and/or event based on the obtained predefined keywords and images with important information includes: inputting the obtained predefined keywords and the images with important information selected at block S104 into a trained image description generation model; and generating an image description text that describes the object and/or event in the image through the image description generation model.

Figure 3A:
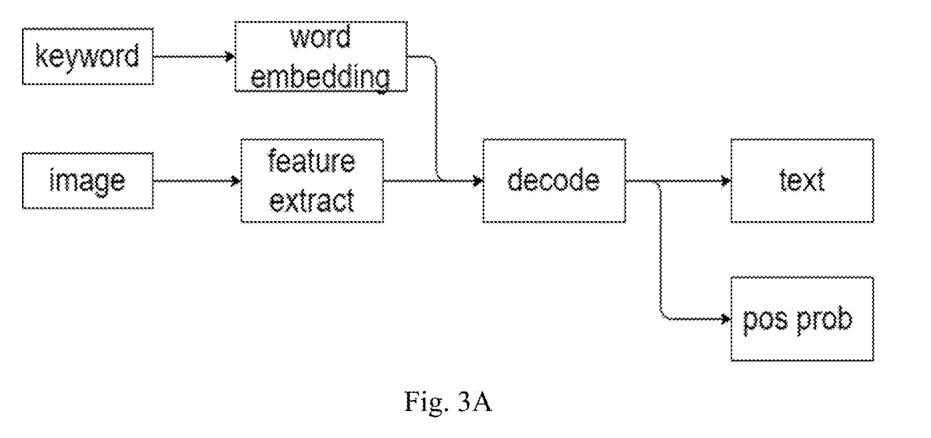
FIG. 3A illustrates a schematic diagram of the training process of an image description text generation model according to an embodiment of the present disclosure.
Figure 3B:
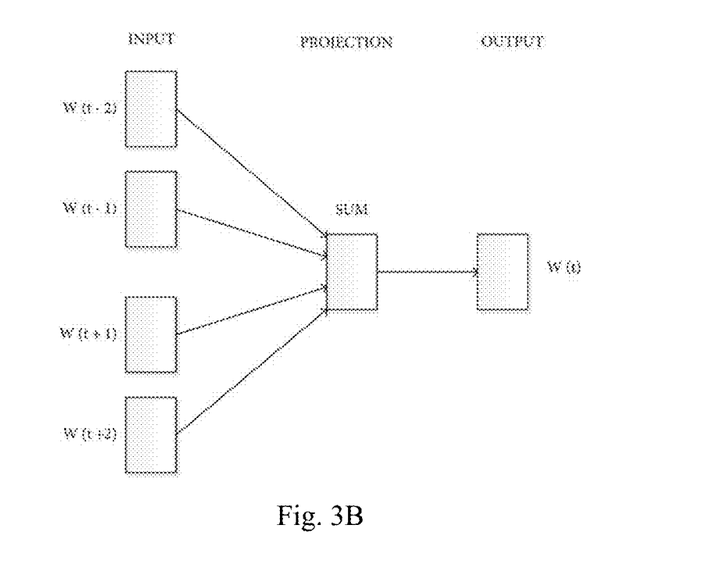
FIG. 3B illustrates a schematic diagram of the Continuous Bag of Words (CBOW) model used during the training process of the image description text generation model according to an embodiment of the present disclosure.

In some embodiments, training an image description generation model includes:
1. Constructing Predefined Trigger Condition Keywords
   During the training and prediction phases, it is necessary to first define a set of trigger condition keywords that will be used to identify important events or objects in the image. For example, for detection types, keywords can include "person", "vehicle", "pet", "package", "cat meow", "dog bark", "glass break", "baby cry", etc.
2. Constructing Training Data
   The construction of training data includes two inputs: predefined trigger condition keywords and selected images with important information. For each input image, a textual description must be provided as the output label, which should accurately reflect the content of the image.
   For example: For an image with a vehicle in the frame, it may be annotated as: "A vehicle is passing through the frame".
3. Training Process
   Refer to FIG. 3A, the training process includes:
   1) Mapping keywords to feature vector space. Specifically, word embedding methods such as word2vec may be used to map detection type keywords to feature vector space, so that each keyword corresponds to a series of one-dimensional feature vectors. For example, the Continuous Bag of Words (CBOW) model may be used, which trains word vectors based on the context to predict the target word. As shown in FIG. 3B, the CBOW model predicts the target word W (t) based on the four words W(t−2), W(t−1), W(t+1), and W(t+2).
   For the CBOW model's prediction of word vectors, there are two stages: the training phase and the prediction phase. In the training phase, the input layer is represented by the one-hot encoding of the context words, each word is multiplied by the embedding layer weights, outputting feature vectors, and the softmax layer calculates the cross-entropy loss. In the prediction phase, each word is multiplied by the embedding layer weights to output feature vectors, i.e., word vectors.
   2) Images pass through a feature extraction network to extract features, which includes networks such as ResNet, VGG, etc.;
   Taking ResNet as an example, ResNet, as a CNN, extracts image features through convolutional layers. Convolutional layers scan the image with filters (convolutional kernels) to capture local features and extract more complex features through deep networks.
   The specific process of feature extraction is as follows:
Input Layer:
   The input image first undergoes normalization processing and then is sent to the first layer of the network.
Convolutional Layer:
   The initial layer of ResNet is a larger convolutional kernel used to extract preliminary features of the image, followed by a max-pooling layer to reduce resolution.
Residual Blocks:
   ResNet consists of multiple residual blocks, each containing several convolutional layers. For example, ResNet18 contains 8 residual blocks, each composed of two 3×3 convolutional layers and a shortcut connection.
Batch Normalization:
   Each convolutional layer is typically followed by a batch normalization layer to accelerate training and improve generalization ability.

Activation Function:

The ReLU activation function is applied to the output of the convolutional layer and batch normalization layer, introducing non-linearity.

Global Average Pooling Layer:

After all residual blocks, the feature map is compressed into a one-dimensional feature vector through the global average pooling layer, preparing for classification.

Fully Connected Layer:

A fully connected layer maps the pooled feature vectors to the category space for final classification.

Output Layer:

A softmax function is used to generate the probability distribution of each category, completing the image classification task.

For example, the input image dimension is in_c*w*h, after passing through the convolutional layer in_c*out_c*k*k, the output feature map dimension is out_c*w*h; after passing through a convolutional kernel with a stride of 2, it can downsample, and the output feature map dimension is out_c*w/2*h/2.

3) Combining text and image-extracted features, processing methods include concatenation, addition, dot product, etc., outputting a one-dimensional feature. Where the text feature dimension is 1*N, and the image feature dimension is n*m.

First, the dimension of the image feature needs to be adjusted: it is first expanded to a 1*M dimension, M=n*m, and then passed through an M*N fully connected layer, thus outputting a 1*N dimension feature.

Secondly, the text and image-extracted features are combined, taking concatenation as an example: the 1*N dimension text feature and the 1*N dimension image feature are horizontally concatenated into a 1*2N feature.

Figure 3C:
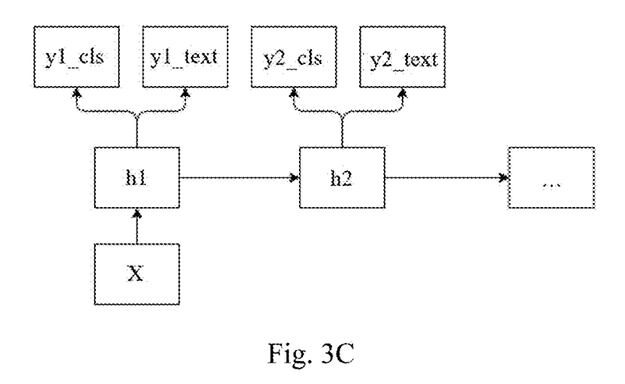
FIG. 3C illustrates a schematic diagram of the network structure for outputting predicted text and position replacement probabilities through the decode layer during the training process of the image description text generation model according to an embodiment of the present disclosure.

4) Output predicted text and position replacement probability through the decode layer The decode layer includes a multi-layer recurrent neural network structure such as RNN models, and the network structure that outputs the predicted text and position replacement probability through the decode layer is shown in FIG. 3C, where X is the combined feature of input text and image, h is the hidden layer, y_text is the output word vector, and y_cls is the position replacement probability value. The specific process includes:

Initialization: Set the initial input to the word embedding of a special start symbol (e.g., <start>).

Time step: At each time step, RNN reads the word embedding of the current word and predicts the probability distribution of the next word based on the current input and the previous hidden state.

Selection and update: Select the word with the highest probability as the output and use its word embedding as the input for the next time step. At the same time, update the hidden state of RNN.

Termination condition: Repeat the above process until a special end symbol (e.g., <end>) is generated or the maximum sequence length is reached.

5) Loss Function: During the training process, a loss function is needed to calculate the difference between the predicted word and the true word, and propagate back to update the model parameters, so that the output results of model training continuously approach the label word vector.

For the loss of the text prediction word vector, cosine distance is used.

Specifically, the cosine distance loss may be expressed as:

$$l_i = \begin{cases} 1 - \cos(a_i, b_i), & \text{if } y_i = 1 \\ \max(0, \cos(a_i, b_i) - \text{margin}), & \text{if } y_i = -1 \end{cases}$$

wherein, the margin serves as a threshold value, which may be set to 0. Vector a represents the label word vector, and vector b represents the predicted word vector. The value of y is 1 for a correctly predicted category and −1 for an incorrectly predicted category.

6) Training

Iterative Optimization: The model parameters are optimized through multiple iterations of training to minimize the loss function.

7) Post-Processing

Text Processing: The generated sequence of words is converted into readable text, including converting words into sentences and adding punctuation, etc.

Figure 2B:
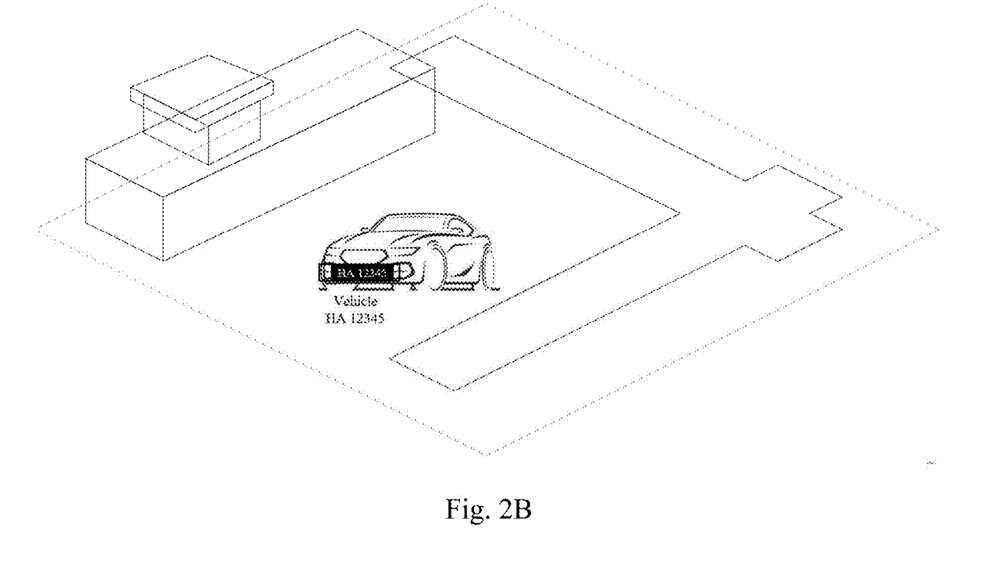

As shown in FIG. 2B, after inputting the predefined keyword ("vehicle") and the image with important information (vehicle detection event) into the aforementioned trained image description generation model, the generated image description text indicating the object and/or event is "A vehicle passed by the door."

Referring back to FIG. 1, at block S112, the cloud server distributes the generated image description text to the terminal device.

In one embodiment, for example, the cloud server can distribute the generated image description text to the terminal device with the corresponding group identifier based on the group identifier of the terminal device. For example, image description text of the "pet" type may be distributed to terminal devices of user A, and image description text of the "vehicle" type may be distributed to terminal devices of user B. The group identifier may be chosen or set by the user themselves.

According to the first embodiment disclosed here, by only generating text descriptions for images or videos with important information when specific objects and/or events are satisfied, and by generating text descriptions based on both the keywords corresponding to the important information and the images with important information, the process of generating text descriptions ensures that key event information is not omitted, thereby improving the accuracy of the generated information.

Second Embodiment

Figure 4:
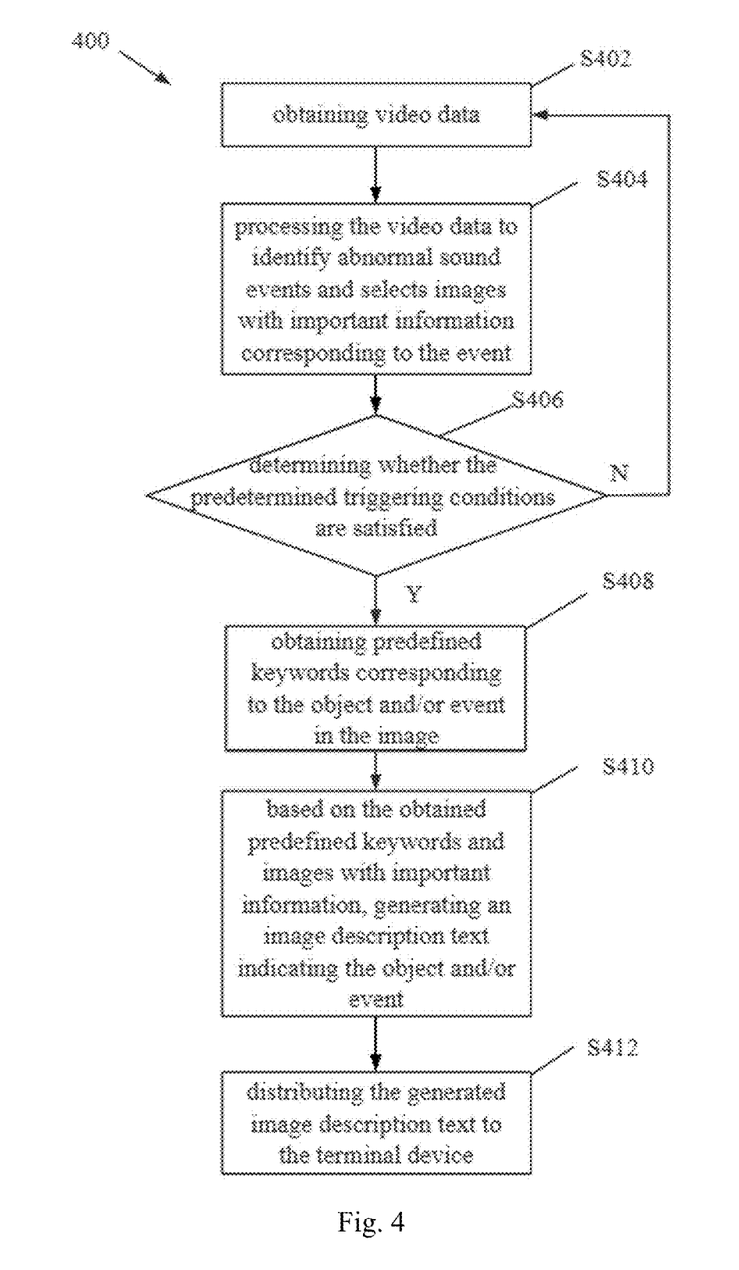
FIG. 4 illustrates a flowchart of a method for distributing image description text according to a second embodiment of the present disclosure.

FIG. 4 illustrates a flowchart of a method 400 for distributing image description text according to a second embodiment of the present disclosure. For example, this method 400 may be executed by an image capturing device or a cloud server. Below, the method 400 for distributing image description text will be specifically described, taking the cloud server execution as an example.

Referring to FIG. 4, the method 400 for distributing image description text according to the second embodiment of the present disclosure begins at block S402. At block S402, the cloud server obtains video data, which in this embodiment, can also include audio data.

At block S404, the cloud server processes the video data to identify abnormal sound events and selects images with important information corresponding to the event. For example, the cloud server can perform audio recognition processing on the audio data included in the obtained video data to detect predefined events. At the same time, the cloud server can also perform image recognition processing on the image data included in the obtained video data and select images corresponding to the event.

Figure 5:
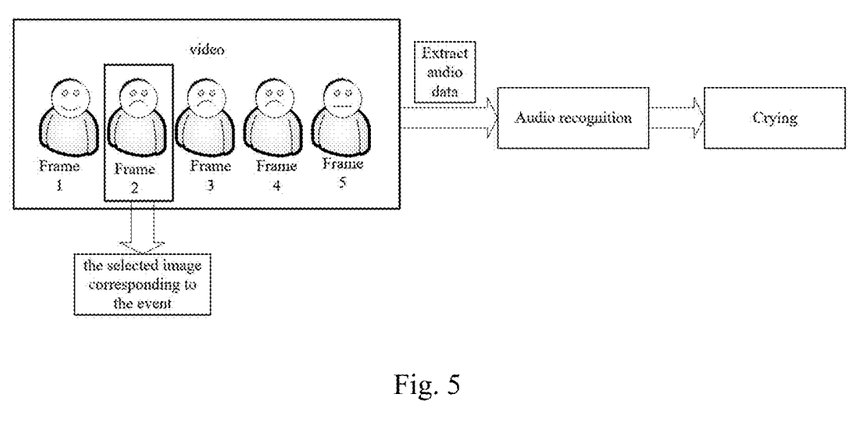
FIG. 5 illustrates a schematic diagram of abnormal sound detection according to the second embodiment of the present disclosure.

In some embodiments, detecting predefined objects and/or events in the audio data included in the obtained video data includes abnormal sound detection, that is, performing audio recognition processing on the audio data to identify abnormal sound events, as shown in FIG. 5, where abnormal sounds include but are not limited to crying, pet barking, and the sound of glass breaking, etc.

In some implementations, abnormal sound detection includes: extracting the Mel spectrogram of the audio data; inputting the Mel spectrogram into the trained abnormal sound classification model; and outputting the predicted abnormal sound type probability values, with the type with the highest probability being the predicted abnormal sound type, as shown in FIG. 5 as "crying". According to FIG. 5, the cloud server extracts audio data from the video data, performs audio recognition, and selects the image corresponding to the timestamp where the abnormal sound occurs, such as the second frame image shown in FIG. 5.

The training of the abnormal sound classification model specifically includes the following processes:

1. Constructing an abnormal sound dataset. The dataset includes audio files and corresponding labels. The labels represent the one-hot encoding of the types of abnormal sounds. The dataset can use open-source sound detection datasets such as FSD50k, DESED, etc., and can also record audio files as needed. For example, recording an audio wav file during which abnormal sounds occur, the label is marked as the corresponding type of abnormal sound.

2. Extracting sound features using the Mel spectrogram.

The process of extracting the Mel spectrogram is as follows:

(1) Pre-emphasis. The purpose is to boost the high-frequency components to flatten the spectrum of the signal.

$$y(t)=x(t)-\alpha x(t-1)$$

where x is the audio signal, and a is the pre-emphasis coefficient.

(2) Frame blocking. N sampling points are grouped into an observation unit called a frame. For example, for a speech signal sampling frequency of 8 kHz, if the frame length N is set to 256, the corresponding time length is 32 ms.

(3) Windowing. Each frame of the signal is windowed to smoothly decay at both ends of the frame. Using the Hamming window as an example:

$$w(n) = 0.54 - 0.46 * \cos\left(\frac{2\pi n}{N-1}\right)$$

where $0 \le n \le N-1$.

(4) Short-time Fourier Transform to obtain the power spectrum. For each framed and windowed signal, perform an N-point FFT transform to convert it into the frequency domain. Take the magnitude of the obtained FFT transform, square it, and then divide by the corresponding FFT point number to get the power spectrum, which may be expressed as:

$$X_a(k) = \sum_{n=0}^{N-1} x(n) e^{-j2\pi nk/N}, 0 \le k \le N$$

where x(n) is the input speech signal, and N represents the number of points in the Fourier transform.

(5) Mel filter bank. The Mel spectrogram is obtained through the Mel filter bank and logarithmic operations. The Mel filter bank consists of a series of triangular filters, typically 40 or 80, which have a response value of 1 at the center frequency point and decay to 0 at the center points of the adjacent filters. The role of the Mel filter bank is to smooth the frequency spectrum.

The frequency response of the triangular filter is defined as:

$$H_m(k) = \begin{cases} 0 & , k < f(m-1) \\ \frac{2(k-f(m-1))}{(f(m+1)-f(m-1))(f(m)-f(m-1))} & , f(m-1) \le k \le f(m) \\ \frac{2(f(m+1)-k)}{(f(m+1)-f(m-1))(f(m)-f(m-1))} & , f(m) \le k \le f(m+1) \\ 0 & , k \ge f(m+1) \end{cases}$$

The logarithmic operation is defined as:

$$s(m) = \ln\left(\sum_{k=0}^{N-1} |X_a(k)|^2 H_m(k)\right), 0 \le m \le M$$

3. Training an Abnormal Sound Classification Model

1) Constructing a CNN Model:

Input Layer: The input layer of the model receives Mel spectrograms, which are typically two-dimensional arrays of time sequences.

Convolutional Layers: Multiple convolutional layers are used to extract features from the Mel spectrograms. Each convolutional layer is usually followed by an activation function (such as ReLU) to introduce non-linearity.

Pooling Layers: Pooling layers (such as max pooling) are used between convolutional layers to reduce the spatial dimensions of the features, decrease computational load, and improve the model's generalization ability.

Fully Connected Layers: After the convolutional layers, one or more fully connected layers are used to further process the features.

Output Layer: The last layer of the network is a fully connected layer with an output dimension of 1×N. It outputs a 1*N dimensional probability value through the softmax function, representing the probability values of N classes of abnormal sounds. The softmax function is used to normalize the output values, representing the probability of event occurrence:

$$\text{Softmax}(z_i) = \frac{\exp(z_i)}{\sum_j \exp(z_j)}$$

where z is the input vector to the softmax function, $z_i$ is the i-th element of the vector, and N is the total number of output classes. The softmax function ensures that the output probabilities sum up to 1, with each element representing the model's confidence in each class.

2) Loss Function

Cross-Entropy Loss: The cross-entropy loss function is used to calculate the difference between the probability distribution predicted by the model and the true labels. The cross-entropy loss function is defined as:

$$\text{Cross Entrophy Loss} = -\frac{1}{N}\sum_{i=1}^{N}\sum_{k=1}^{K} y_{i,k}\log(p_{i,k})$$

where N is the number of samples, K is the number of classes, y is the true label, and p is the predicted probability value.

Referring back to FIG. 4, at block S406, the image capturing device or cloud server determines whether the predetermined triggering conditions are satisfied. If they are satisfied, the process proceeds to block S408; if not, it returns to block S402. For example, in response to the object and/or event including at least one of abnormal sound events, object detection events, and facial recognition events, it is determined that the object and/or event satisfy the predetermined triggering conditions.

At block S408, in response to the object and/or event satisfying the predetermined triggering conditions, predefined keywords corresponding to the object and/or event in the image are obtained. Obtaining predefined keywords corresponding to the object and/or event in the image includes: retrieving predefined keywords corresponding to the object and/or event in the image from a pre-stored keyword library. Predefined keywords may include detection type trigger condition keywords, such as "cat meow", "dog bark", "glass break", "baby cry", etc.

In an embodiment, in response to the audio recognition processing output at block S404 being an abnormal sound, it may be determined that the object and/or event satisfies the predetermined triggering conditions, and, in response to the abnormal sound event satisfying the predetermined triggering conditions, predefined keywords corresponding to the abnormal sound event are obtained, for example, "crying."

At block S410, based on the obtained predefined keywords and images with important information, an image description text indicating the object and/or event is generated.

In one embodiment, generating an image description text indicating the object and/or event based on the obtained predefined keywords and images with important information includes: inputting the obtained predefined keywords and the images with important information selected at block S404 into a trained image description generation model, where the images with important information selected at block S404 correspond to the images where the abnormal sound occurs. Then, the image description generation model generates an image description text that describes the object and/or event in the image.

For the generation process of the image description text, for example, the predefined keyword "crying" and the image with important information selected at block S404 are input into the trained image description generation model, where the predefined keyword "crying" is mapped to the feature vector space and the image is feature-extracted, for example, the output of the image feature extraction network represents "person." The image description generation model generates an image description text that describes the object and/or event in the image, for example, "a person is crying in the frame".

The specific details of the image description generation model are similar to the process described above regarding vehicle detection, and will not be repeated here.

Referring back to FIG. 4, at block S412, the image capturing device or cloud server distributes the generated image description text to the terminal device with the corresponding group identifier based on the group identifier of the terminal device. For example, image description text of the "pet barking" type is distributed to terminal devices of user A, and image description text of the "crying" type is distributed to terminal devices of user B.

Thus, according to the second embodiment disclosed here, further by detecting abnormal sounds, generating text descriptions for images or videos corresponding to abnormal sounds with important information, and generating text descriptions based on both the keywords corresponding to the important information and the images with important information, the process of generating text descriptions ensures that key event information is not omitted, thereby improving the accuracy of the generated information.

Third Embodiment

According to the methods for distributing image description text from the aforementioned embodiments, it is possible to achieve the functionality of obtaining predefined keywords corresponding to the object and/or event in the image when the predetermined triggering conditions are satisfied, and generating image description text indicating the object and/or event based on the obtained predefined keywords and images with important information.

Furthermore, in the method according to the aforementioned embodiments, after conducting object detection events, it is preferable to perform object recognition events, such as license plate recognition and/or facial recognition, to generate textual descriptions that include further refined precise keywords. These further refined precise keywords may be recognition type trigger condition keywords, such as "license plate" (including different license plate numbers), "familiar" (including pre-recorded names), "stranger", etc.

Figure 6:
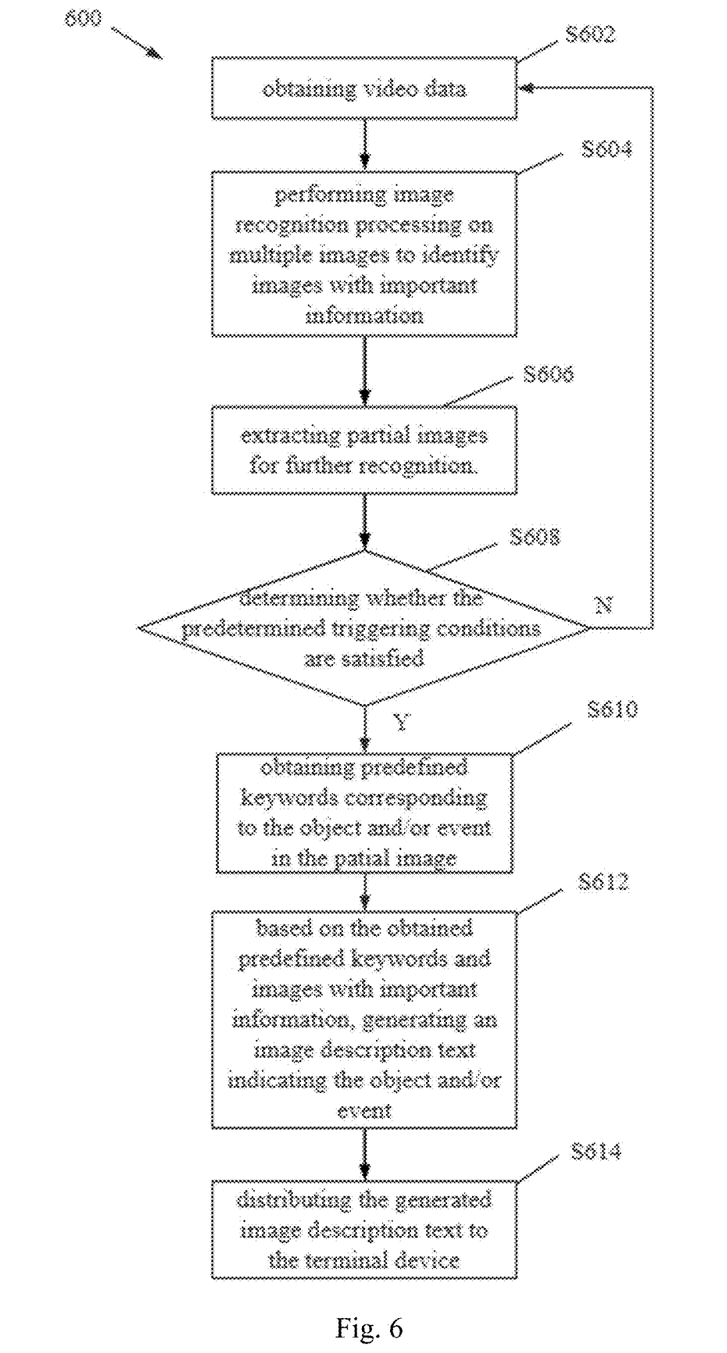
FIG. 6 illustrates a flowchart of the method for distributing image description text according to the third embodiment of the present disclosure.

FIG. 6 illustrates a flowchart of the method 600 for distributing image description text according to the third embodiment of the present disclosure. For example, this method 600 may be executed by an image capturing device or a cloud server. FIG. 6 illustrates a process that includes steps S602 through S614, the embodiment in FIG. 6 differs from the embodiment in FIG. 1 only in step S606, so similar processes to FIG. 1 will not be repeated here.

At block S606, the image capturing device or cloud server extracts partial images for further recognition. For example, in the license plate recognition process, the neural network model's model inference also includes: extracting partial images that include the license plate shape; inputting the partial images that include the license plate shape into the trained neural network model to recognize the license plate characters corresponding to the license plate; and outputting the license plate characters, which are connected from left to right to form the license plate number. As shown in the block and the labeled text "Vehicle "HA 12345"" in FIG. 2B.

Additionally, the keyword library also stores precise keywords that further define the information of some keywords, such as "license plate" (including different license plate numbers), "familiar" (including pre-recorded names), "stranger," etc.

According to the embodiment, the process of training the neural network model includes:
1. Dataset CONSTRUCTION
   When constructing a dataset for license plate recognition, the input is license plate images, and the output includes the character position and type one-hot labels corresponding to the license plate. This process may be divided into the following steps:

Image Collection: Collect a large number of license plate images.

Image Annotation: Annotate each license plate image, including the bounding block or the position of four key points of the license plate, as well as the category label of each character on the license plate. Category labels may be numbers 0-9, letters A-Z, and Chinese provinces, etc.

2. Training Neural Network Model

For license plate recognition, various neural network models may be trained, including but not limited to YOLO, RCNN series detection models, etc.

Loss Function: During the training process, Focal Loss may be used to address class imbalance issues, and cross-entropy loss may be used to optimize classification tasks. These loss functions help improve the model's performance in complex scenarios.

Training Strategy: Use appropriate training parameters such as learning rate and batch size, and employ data augmentation techniques to enhance the model's robustness.

Training the image description text generation model also requires building recognition type trigger condition keywords, such as "license plate" (including different license plate numbers), "familiar" (including pre-recorded names), "stranger", etc.; during the training phase, when outputting predicted text through the decode layer, the decode layer will output both the predicted text and the probability of replaceable word positions; and during the prediction phase, the image description text generation model will obtain recognition type trigger condition keywords, use the position probability of replaceable words in the image description text generated by the image description generation model to determine the keyword corresponding to the replaceable word with the highest probability, for example: license plate number "HA 12345"; and replace the replaceable words in the image description text with the determined keywords to generate image description text that includes recognition type trigger condition keywords.

For example, after generating the image description text "A vehicle passed by" according to the embodiment in FIG. 1, it is also necessary to label the replaceable positions for recognition types, such as: |A| vehicle| passed| by|, with a total of 4 effective characters that may be replaced. If the vehicle's "license plate number "HA 12345"" is recognized, then replace "vehicle" with "vehicle with license plate number "HA 12345"", and the replacement one-hot label becomes: 0-1-0-0, with the middle 1 indicating the position of |vehicle|, representing the replaceable area. Therefore, the final output of the image description text generation model according to the embodiment in FIG. 5 is "A vehicle with license plate number "HA 12345" passed by".

According to the third embodiment of the method for distributing image description text disclosed in this publication, it is possible to generate image description text indicating objects and/or events based on the obtained predefined keywords and images with important information, thereby achieving the function of pushing key information and reminder of image description text. Furthermore, after detecting objects in the image, further recognition of the object may be performed to obtain more refined keywords and generate more precise image description text that includes more refined keywords, ensuring that the process of generating text does not omit key object and/or event information.

Fourth Embodiment

Figure 7:
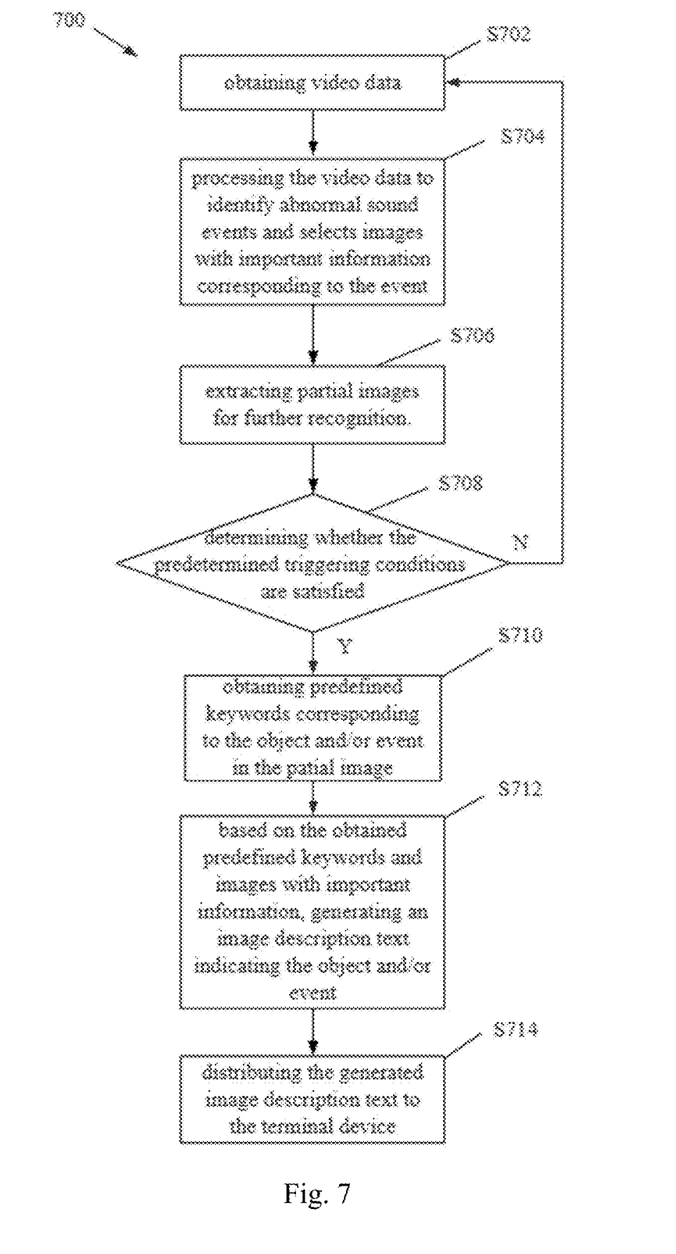
FIG. 7 illustrates a flowchart of the method for distributing image description text according to the fourth embodiment of the present disclosure.

FIG. 7 illustrates a flowchart of the method 700 for distributing image description text according to the fourth embodiment of the present disclosure. For example, this method 700 may be executed by an image capturing device or a cloud server. FIG. 7 illustrates a process that includes steps S702 through S714, the embodiment in FIG. 7 differs from the embodiment in FIG. 4 only in step S706, so similar processes to FIG. 4 will not be repeated here.

At block S706, the image capturing device or cloud server performs further recognition on the identified objects and/or events. For example, in the facial/human body recognition process, the neural network model's model inference also includes: inputting the acquired image into a trained neural network model. For instance, inputting the image into a trained neural network model and outputting prediction results, including the location of the facial/human body in the image and the labeled text "person".

The neural network model's model inference also includes: extracting partial images that include the facial/human body; inputting the extracted partial images into a feature extraction network; extracting facial/human body features through the feature extraction network; and comparing the extracted facial/human body features with pre-recorded facial/human body features to determine whether the individual is familiar or a stranger.

Taking the detection of crying at block S706 as an example, the image capturing device or cloud server can further obtain the location of the facial/human body in the image and extract partial images that include the facial/human body using a process similar to the vehicle detection process mentioned above. Then, the image capturing device or cloud server inputs the extracted partial images into a trained feature extraction network. The feature extraction network extracts facial/human body features, and compares these features with pre-recorded facial/human body features to determine whether the individual is familiar or a stranger. The keyword library also stores precise keywords that further define some keywords, such as "familiar" (including pre-recorded names), "stranger", etc.

According to the embodiment, the process of training the feature extraction network includes:

1. Dataset Construction

When constructing a pedestrian/facial dataset, it is necessary to collect multiple groups of images of the same person's form/face. These images should be taken under different lighting, angles, and expressions to ensure the diversity and coverage of the dataset.

2. Training Feature Extraction Network

1) Use feature extraction networks such as ResNet, VGG, etc., to extract feature vectors from facial images. The feature vectors contain key information about the face, such as geometric features, texture features, etc.

2) Feature Comparison: Compare the extracted feature vectors with the known facial feature vectors stored in the database. Common comparison methods include Euclidean distance, cosine similarity, etc.

3) Classification Decision: Decide whether to match based on the similarity score between feature vectors. Set a threshold; when the similarity score exceeds this threshold, the two faces are considered a match.

4) Result Output: Output the results of facial recognition, including prompts for successful or failed matches, as well as the confidence of the match.

5) Loss Function: Loss functions such as triplet loss, center loss, ArcFace Loss, etc., can optimize the model's feature extraction capabilities, making the facial features of the same person more compact and the facial features of different people more dispersed, thereby improving the accuracy of facial recognition.

6) Training Strategy: Adjust hyperparameters such as learning rate, batch size, etc.

Training the image description text generation model also requires building recognition type trigger condition keywords, such as "familiar" (including pre-recorded names), "stranger", etc.; during the training phase, when outputting predicted text through the decode layer, the decode layer will output both the predicted text and the probability of replaceable word positions; and during the prediction phase, the image description text generation model will obtain recognition type trigger condition keywords, use the position probability of replaceable words in the image description text generated by the image description generation model to determine the keyword corresponding to the replaceable word with the highest probability, for example: "familiar Tom" or "stranger"; and replace the replaceable words in the image description text with the determined keywords to generate image description text that includes recognition type trigger condition keywords.

For example, after generating the image description text "Someone is crying" according to the embodiment in FIG. 4, it is also necessary to label the replaceable positions for recognition types, such as: |Someone| is |crying|, with a total of 4 effective characters that may be replaced. If the person is recognized as "familiar Tom," then replace "Someone" with "familiar Tom," and the replacement one-hot label becomes: 1-0-0-0, with the middle 1 indicating the position of |Someone|, representing the replaceable area. Therefore, the final output of the image description text generation model according to the embodiment in FIG. 7 is "Familiar Tom is crying."

According to the fourth embodiment of the method for distributing image description text disclosed in this publication, it is possible to generate image description text indicating objects and/or events based on the obtained predefined keywords and images with important information, thereby achieving the function of key push and reminder of image description text. Furthermore, after detecting objects in the image, further recognition of the object may be performed to obtain more refined keywords and generate more precise image description text that includes more refined keywords, ensuring that the process of generating text does not omit key object and/or event information.

The present disclosure provides a non-transitory computer-readable medium on which computer instructions are stored, which, when executed by a processor, perform one or more steps of various methods and their additional aspects as described above.

Illustratively, the non-transitory computer-readable medium may be any combination of one or more computer-readable storage media, for example, one computer-readable storage medium contains program codes for executing the above various methods.

Illustratively, when the program code is read by a computer, the computer can execute the program code stored in the computer storage medium, and perform one or more steps to realize, for example, the above-mentioned various methods and their additional aspects according to at least one embodiment of the present disclosure.

Illustratively, the non-transitory computer-readable medium may include a memory card of a smart phone, a storage part of a tablet computer, a hard disk of a personal computer, a random access memory (RAM), a read-only memory (ROM), an erasable programmable read-only memory (EPROM), a portable compact disk read-only memory (CD-ROM), a flash memory, and other non-transitory readable storage media or any combination thereof.

Figure 8:
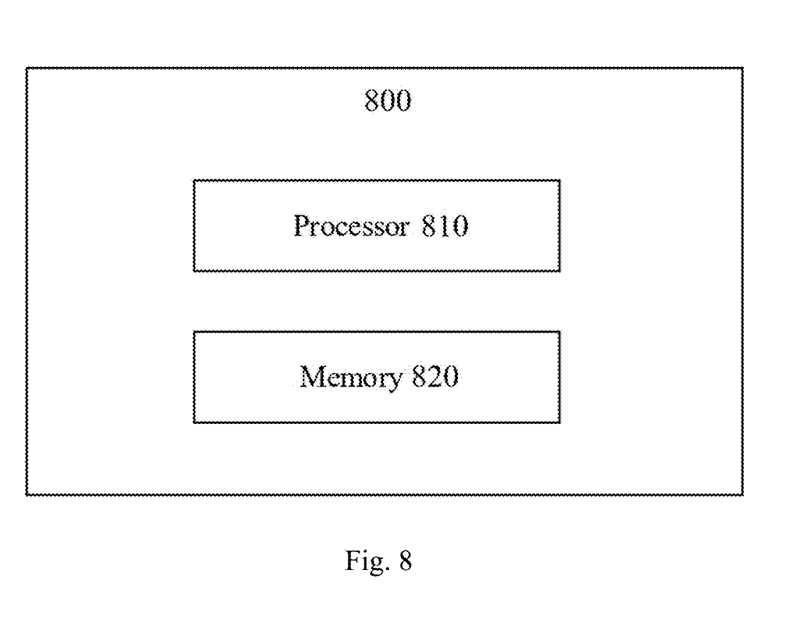
FIG. 8 is a schematic block diagram of an electronic apparatus according to one embodiment of the present disclosure.

FIG. 8 is a schematic block diagram of an electronic apparatus according to one embodiment of the present disclosure. It should be noted that electronic apparatus 800 depicted in FIG. 8 may be used to perform the operations of controlling monitoring equipment as described in the above.

As shown in FIG. 8, electronic apparatus 800 may comprise processor 810 and memory 820.

Examples of processor 810 comprise microprocessors, microcontrollers, digital signal processors (DSPs), field programmable gate arrays (FPGAs), programmable logic equipment (PLDs), state machines, gated logic, discrete hardware circuits, and other suitable hardware configured to perform the various functionality described throughout this disclosure.

Processor 810 may execute software. Software shall be construed broadly to mean instructions, instruction sets, code, code segments, program code, programs, subprograms, software devices, applications, software applications, software packages, routines, subroutines, objects, executables, threads of execution, procedures, functions, etc., whether referred to as software, firmware, middleware, microcode, hardware description language, or otherwise. The software may reside on memory 820.

Memory 820 may be a non-transitory computer-readable medium. A non-transitory computer-readable medium includes, by way of example, a magnetic storage equipment (e.g., hard disk, floppy disk, magnetic strip), an optical disk (e.g., a compact disc (CD) or a digital versatile disc (DVD)), a smart card, a flash memory equipment (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. Memory 820 may reside in processor 810, external to processor 810, or distributed across multiple entities including processor 810. Memory 820 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

The electronic apparatus 800 may be, for example, a network camera, a system-on-a-chip (SOC) or an equipment including the SOC, such as a mobile phone, a tablet computer, a notebook computer, an e-book, a game machine, a TV set, a digital photo frame, a navigator, a home appliance, a communication base station, an industrial controller, a server, or any combination of data processing equipment and hardware, and the embodiment of the present disclosure does not limit this.

The present disclosure may be a system, a method, and/or a computer program product at any possible technical detail level of integration. The computer program product may include a computer readable storage medium (or media)

having computer readable program instructions thereon for causing a processor to carry out aspects of the present disclosure.

An expression such as "according to", "based on", "depend on", and so on as used in the disclosure does not mean "according only to", "based only on", or "dependent only on", unless it is explicitly otherwise stated. In other words, such expression generally means "according at least to", "based at least on", or "depend at least on" in the disclosure.

Any reference in the disclosure to an element using the designation "first", "second" and so forth is not intended to comprehensively limit the number or order of such elements. These expressions may be used in the disclosure as a convenient method for distinguishing two or more units. Thus, a reference to a first unit and a second unit does not imply that only two units may be employed or that the first unit must precede the second unit in some form.

The term "determining" used in the disclosure may include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth may also be regarded as "determining". That is, regarding "determining", several actions may be regarded as "determining".

The terms such as "connected", "coupled" or any of their variants used in the disclosure refer to any connection or combination, direct or indirect, between two or more units, which may include the following situations: between two units that are "connected" or "coupled" with each other, there are one or more intermediate units. The coupling or connection between the units may be physical or logical or may also be a combination of the two. As used in the disclosure, two units may be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

It should be noted that the above description is only some embodiments of the present disclosure and an illustration of the applied technical principles. It should be understood by those skilled in the art that the present disclosure scope involved in the present disclosure is not limited to the technical solutions resulting from specific combinations of the above technical features, but also encompasses other technical solutions resulting from any combination of the above technical features or their equivalents without departing from the above disclosed concept, for example, the technical solutions formed by replacing between the above features and the technical features with similar functions disclosed in the present disclosure (but not limited hereto).

The present disclosure has been described in detail above, but it is obvious to those skilled in the art that the present disclosure is not limited to the embodiments described in the disclosure. The present disclosure may be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for distributing image description text, comprising:
    obtaining video data including multiple images;
    performing image recognition processing on the multiple images to identify images with important information, the important information indicates objects and/or events in the images;
    in response to the objects and/or events being user-predefined objects and/or events of interest, determining that the objects and/or events satisfy predetermined triggering conditions;
    in response to the objects and/or events satisfying the predetermined triggering conditions, obtaining pre-defined keywords corresponding to the objects and/or events in the images;
    generating image description text indicating the objects and/or events based on the obtained predefined keywords and the images with important information; and
    distributing the generated image description text to terminal device(s).

2. The method according to claim 1, wherein in response to the object and/or event comprising at least one of motion detection events, object detection events, license plate recognition events, and facial recognition events, determining that the object and/or event satisfies the predetermined triggering conditions.

3. The method according to claim 2, wherein, performing the image recognition processing on the multiple images to identify the images with important information comprises:
    constructing a training dataset for the object and/or event;
    training a neural network model using the training dataset to obtain a trained model;
    inputting the multiple images into the trained model for model inference to obtain information indicating the object and/or event.

4. The method according to claim 3, wherein in response to the specific object and/or event being a motion/object detection event, the multiple images are input into the trained model for model inference to obtain information indicating the position and shape of the object in the image.

5. The method according to claim 3, wherein in response to the specific object and/or event being a license plate recognition event, the multiple images are input into the trained model for model inference to obtain the position and shape of the license plate in the image.

6. The method according to claim 5, wherein the model inference further comprises:
    extracting partial images that include the license plate shape;
    inputting the partial images that include the license plate shape into the trained neural network model to recognize the license plate characters corresponding to the license plate; and
    outputting the license plate characters, which are connected from left to right to form the license plate number.

7. The method according to claim 6, wherein in response to the specific object and/or event being a facial/human body recognition event, the multiple images are input into the trained model for model inference to obtain the position of the facial/human body in the image.

8. The method according to claim 7, wherein the model inference further comprises:
- extracting partial images that include the facial/human body;
- inputting the extracted partial images into a feature extraction network;
- extracting facial/human body features through the feature extraction network; and
- comparing the extracted facial/human body features with pre-registered facial/human body features to determine the distance, thereby identifying whether the recognized face and/or human body is that of a familiar or a stranger.

9. The method according to claim 2, wherein the video data further comprises audio data, and the method further comprises:
- performing audio recognition processing on the audio data to identify abnormal sound events.

10. The method according to claim 9, wherein in response to the specific object and/or event being an abnormal sound event, determining that the object and/or event satisfies the predetermined triggering conditions; and
- obtaining the predefined keywords corresponding to the object and/or event in the image also includes:
- obtaining predefined keywords corresponding to the object and/or event in the image that corresponds to the described abnormal sound event.

11. The method according to claim 9, wherein performing audio recognition processing on the audio data to identify abnormal sound events comprises:
- constructing a training dataset for abnormal sounds;
- training an abnormal sound classification model using the training dataset, which includes:
- extracting time-frequency features of the audio data, the time-frequency features including Mel spectrograms;
- inputting the Mel spectrograms into the abnormal sound classification model and outputting probability values for different abnormal sounds; and
- performing model inference on the audio data, which includes:
- extracting the Mel spectrograms from the audio data;
- inputting the Mel spectrograms into the trained abnormal sound classification model; and
- outputting the predicted type of abnormal sound.

12. The method according to claim 10, wherein in response to the specific object and/or event satisfying the predetermined triggering conditions, obtaining the predefined keywords corresponding to the object and/or event in the image includes:
- obtaining predefined keywords corresponding to the object and/or event in the image from a pre-stored keyword library.

13. The method according to claim 12, wherein the keyword library further stores precise keywords that further define the information related to certain keywords.

14. The method according to claim 13, wherein based on the obtained predefined keywords and the images with important information, generating an image description text indicating the object and/or event comprises:
- inputting the obtained predefined keywords and the images with important information into a trained image description generation model;
- generating an image description text that describes the object and/or event in the image through the image description generation model, the image description text includes the predefined keywords.

15. The method according to claim 14, wherein generating the image description text indicating the object and/or event comprises:
- utilizing the position probabilities for indicating the replaceable words in the generated image description text generated by the image description generation model to determine keywords corresponding to the replaceable words with highest possibility; and
- replacing the replaceable words in the image description text with the determined keywords to generate the image description text indicating the object and/or event.

16. The method according to claim 1, wherein distributing the generated image description text to terminal device(s) further comprises: distributing the generated image description text to terminal device(s) with corresponding group identifiers based on the group identifier of the terminal device.

17. A non-transitory computer-readable medium having stored thereon instructions which, when executed, cause a processor to perform the method of claim 1.

18. An electronic apparatus for distributing image description text, comprising:
- a memory;
- a processor, configured to:
  - obtain video data including multiple images;
  - perform image recognition processing on the multiple images to identify images with important information, the important information indicates objects and/or events in the images;
  - in response to the objects and/or events being user-predefined objects and/or events of interest, determining that the objects and/or events satisfy predetermined triggering conditions;
  - in response to the objects and/or events satisfying the predetermined triggering conditions, obtain predefined keywords corresponding to the objects and/or events in the images;
  - generate image description text indicating the objects and/or events based on the obtained predefined keywords and the images with important information; and
  - distribute the generated image description text to terminal device(s).

19. The electronic apparatus according to claim 18, wherein the electronic device is an image capturing device or a cloud server.

* * * * *